United States Patent Office 3,660,483
Patented May 2, 1972

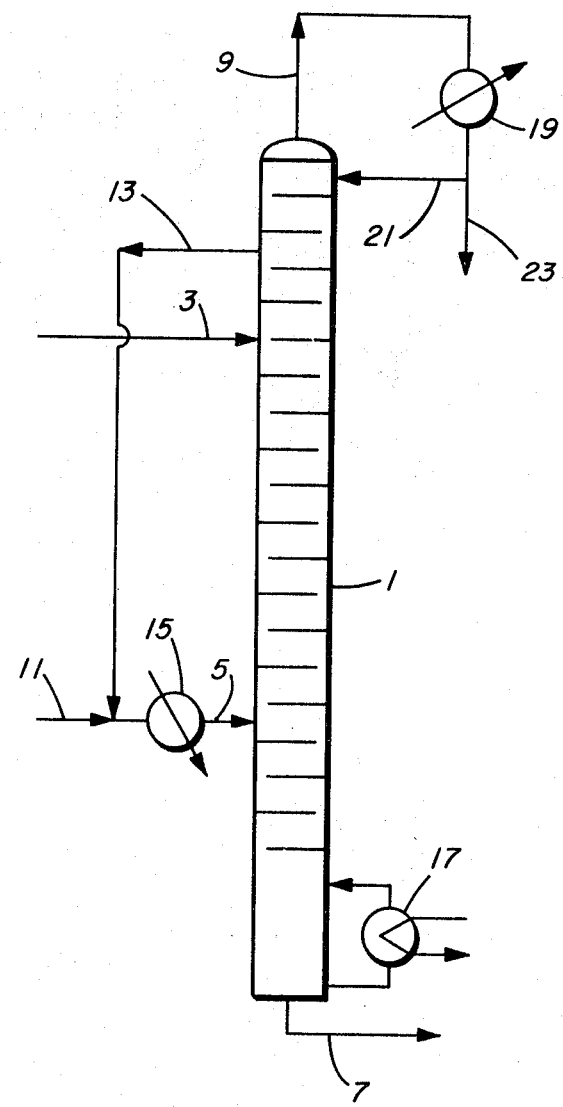

3,660,483
SEPARATION OF FORMIC ACID FROM ACETIC ACID
Charles C. Hobbs and John A. Bedford, Corpus Christi, Tex., assignors to Celanese Corporation, New York, N.Y.
Filed Oct. 2, 1969, Ser. No. 863,166
Int. Cl. C07c 51/44
U.S. Cl. 260—541         2 Claims

ABSTRACT OF THE DISCLOSURE

Formic acid is removed from a crude liquid comprising predominantly acetic acid and formic acid by passing the liquid downwardly through a stripping column within which the liquid, at an elevated temperature, is contacted countercurrently with an upwardly-flowing vapor comprising a lower alkanol or a lower alkyl acetate which has a boiling point lower than that of acetic acid. Within the column the formic acid reacts with the alkanol or alkyl acetate to form the corresponding alkyl formate which is removed as vapor from the head of the column. From the base of the column there is withdrawn a purified acetic acid having a formic acid content lower than that of the crude mixture fed into the head of the column.

BACKGROUND OF THE INVENTION

Formic acid is an undesired contaminant in acetic acid as produced by a number of presently-employed processes. In particular, crude acetic acid as produced by the partial oxidation of a hydrocarbon, such as butane, contains a substantial quantity of formic acid. Both for the sake of product quality, when the acetic acid is to be sold in the ordinary channels of commerce, and also in order to prevent the severe corrosion caused by formic acid when the acetic acid is to be employed as a chemical intermediate, it is necessary that the formic acid be removed from the crude acetic acid as promptly and as thoroughly as possible. Very small quantities of formic acid can render acetic acid very much more corrosive than it otherwise would be.

Several methods are known in the art for separating formic acid from acetic acid. Of these, two of the more successful are (a) azeotropically distilling the formic acid away from a distillation residue comprising the acetic acid and (b) subjecting the crude acetic acid, at an elevated temperautre, to the action of any of a number of catalysts which have the property of decomposing the formic acid to carbon monoxide and water or of oxidizing formic acid. These methods are both efficacious, but each has some drawbacks. Azeotropic distillation, for example, requires substantial quantities of steam and cooling water and also, since it does not destroy the formic acid, is subject to sever corrosion problems in those portions of the apparatus handling the formic acid. Catalytic decomposition usually results in the loss of some of the acetic acid along with the decomposed formic acid and also commonly entails the need for continuous or periodic regeneration of the catalyst, e.g. to remove carbonaceous deposits therefrom.

The primary object of the present invention is to provide a method for separating formic acid from acetic acid which is simple and effective, which does not require the employment of unusually high process temperatures, and which affords a method for rapidly converting the formic acid to a chemically-combined form in which it is not corrosive to the processing apparatus.

SUMMARY OF THE INVENTION

In accordance with the present invention a crude acetic acid stream containing formic acid is contacted countercurrently and at moderately elevated temperatures with a vapor comprising a formic acid scavenger which is a member of the group consisting of lower alkanols and lower alkyl acetates which are more volatile than acetic acid, e.g. members of this group which have boiling points lower than that of acetic acid. As the formic acid scavenger is contacted countercurrently with the crude acetic acid in the manner just described, the scavenger reacts with the formic acid contained in the crude acetic acid to form, as the reaction product, the formate ester of the lower alkyl moiety component of the scavenger compound. This reaction product is of sharply higher volatility than acetic acid and is therefore readily separated from the acetic acid, as for example by withdrawing it from the reaction zone as a vapor while the acetic acid remains in the reaction zone as a liquid.

The reaction is typically carried out in a stripping column, the crude acetic acid being fed into the upper portion as a liquid while a vapor comprising the scavenger is introduced into the lower portion to be passed upwardly through the column in countercurrent contact with the downwardly-flowing acetic acid. The formate-containing reaction product is withdrawn as a vapor from the head of the column, and the purified acetic acid is withdrawn from the base.

Typically and preferably, the base of the column is fitted with a source of boilup heat, such as a conventional reboiler, to generate the requisite flow of scavenging vapors upward through the column and also to maintain an elevated temperature in the column. Typically also, the reaction product is rectified to separate it into (a) a concentrated distillate comprising predominantly the alkyl formate, which is withdrawn from the system, and (b) unreacted scavenger, which is recycled to the base of the stripping column.

The reaction between the formic acid and the formic acid scavenger proceeds very well without a catalyst at reasonably elevated temperatures, e.g. about 60° C. to about 100° C. or higher, e.g. at about 150–200° C., but a catalyst can be employed if desired to accelerate the reaction, particularly at the lower temperatures around about 60° C. Any of the many esterification catalysts known in the art can be employed, but a phosphorus acid, e.g. ortho-phosphoric acid, is particularly suitable.

DETAILED DESCRIPTION OF THE INVENTION

Description of the drawing

The drawing illustrates the practice of the invention in a distillation column equipped with a reboiler and condenser and having a rectification section above, and a residue-stripping section below, the stripping-reaction section which is essential in practicing the invention. As will be explained, the invention in its most fundamental aspect does not require these auxiliary facilities although they are ordinarily preferred.

Column 1 is fitted with a conduit 3 whereby a liquid can be introduced into the upper portion of the column and also with a conduit 5 whereby another stream, either liquid or gaseous, can be introduced into the lower portion of the column. A vaporizer, e.g. a steam-heated heat exchanger, connects with conduit 5 and can be employed to vaporize a liquid being introduced into the system through conduit 11. Vapors are withdrawn from the head of the column through conduit 9, and liquids are withdrawn from the base through conduit 7. Reboiler 17, which is of any conventional type, provides boilup heat to maintain an elevated temperature within the column; it can also be employed if desired to perform the vaporization duty otherwise required of heat exchanger 15. Heat exchanger 19 is a conventional condenser, condensate from which is withdrawn from the system through conduit 23 with a portion being returned, as desired, as reflux to the column through conduit 21.

Conduit 13 is employed, in some embodiments of the inention to return to the lower portion of the column a scavenger sidestream from a location above conduit 3 and below the topmost plate of the column.

In the simplest embodiment of the invention, conduit 3 is connected to the topmost plate of the column, conduit 13 is not employed, and conduit 5 is connected to the column at or near the lowest plate. Only one of the two exchangers 15 and 17 is necessary in this instance. In practicing this embodiment, the crude mixture of acetic acid and formic acid is introduced onto the top plate through conduit 3 while the formic acid scavenger is introduced into the bottom of the column through conduit 5. The scavenger is either vaporized by heat exchanger 15 prior to introduction into the column or else, after being introduced in a liquid form, is vaporized by reboiler 17. The scavenging vapors pass upward through the column and in so doing are contacted countercurrently with the downwardly-flowing liquid introduced through conduit 3. As the ascending vapors and descending liquid are contacted intimately with one another on the plates of the column (or on the surfaces of packing if the column be a packed column), the alkyl moiety contained in the scavenger vapors reacts with the formic acid contained in the downwardly-flowing liquid to form the corresponding lower alkyl formate, which, being sharply higher in volatility than acetic acid, passes out the top of the column through conduit 9 as a vapor comprising the alkyl formate, unreacted scavenger vapor, and small quantities of acetic acid. The vapor withdrawn from the column is processed as desired, e.g. to recover unreacted scavenger and acetic acid. Acetic acid having a reduced formic acid content is withdrawn from the base of the column through conduit 7. In this embodiment of the invention it will be noted that, while the basic purpose of reducing the formic acid content of the crude acetic acid has been accomplished, there is some loss of acetic acid in the reaction product vapors withdrawn through conduit 9. There is also some loss of scavenger in the purified acetic acid withdrawn from conduit 7.

In another embodiment of the invention, which is particularly useful and which is that shown in the drawing, a plurality of rectification plates is provided in the column between the head thereof and the location of conduit 3; likewise a plurality of acetic acid stripping plates is provided in the bottom of the column between the reboiler and the location of conduit 5. In this embodiment, reflux is also provided, through conduit 21, and the use of reboiler 17 or some equivalent source of reboil heat becomes essential rather than optional. In this embodiment crude acid is introduced through conduit 3 as before, and the scavenger is introduced through conduit 5 also as before, but now, with reflux applied to the top of the column and with reboil heat applied to the base, a highly concentrated alkyl formate distillate is produced for withdrawal through conduit 23 while a stripped purified acetic acid, lean in both formic acid and formic acid scavenger, is withdrawn from the base of the column through conduit 7. In addition, it becomes possible to recycle unreacted scavenger by withdrawing a sidestream from the upper portion of the column at a level intermediate between conduit 3 and the topmost plate of the column. The withdrawn sidestream, which comprises predominantly the formic acid scavenger species, is withdrawn through conduit 13, preferably as a liquid from one of the plates of the column, and commingled with fresh scavenger being introduced into the system through conduit 11.

Suitable scavenger species

As previously indicated, suitable scavengers are members of the group consisting of lower alkanols and lower alkyl acetates which are more volatile than acetic acid, as indicated by their having boiling points (at the pressure to be employed in the stripping column) lower than that of acetic acid. All such alkanols and esters, when in the presence of a mixture of formic acid and acetic acid, have been found to react so preferentially with formic acid as compared with acetic acid that the formic acid, even when present in small quantities, is rapidly converted to the alkyl formate. Particularly useful in practicing the invention, however, are methanol and ethanol and their acetates. The alcohols react more rapidly than the acetates. At a given column pressure, ethanol is faster-reacting than methanol because its higher boiling point results in higher reaction temperature, but methanol, being less expensive and still having an entirely adequate rate of reaction, is ordinarily preferred. The temperature, when using methanol, can be elevated of course by raising the column pressure. If the scavenger is introduced into the system as the alcohol (as distinguished from the ester), a portion will be converted to the acetate ester in any event within the column, and, when recycle conduit 13 is being employed as previously described, the scavenger introduced into the lower portion of the column will comprise acetate ester at least in part.

Stoichiometric relationships

For complete removal of the formic acid contained in the crude acetic acid, at least one mole of scavenger compound should be introduced into the lower portion of the stripping column for each mole of formic acid contained in the crude acetic acid introduced into the upper portion of the column. It will of course be recognized that a lower ratio of scavenger to formic acid can be employed if for any reason complete removal of the formic acid is not required. Ordinarily, however, complete, or nearly complete, removal of the formic acid would be desired.

At least one mole of scavenger should be introduced into the column through conduit 5 for each mole of formic acid introduced through conduit 3. Higher ratios, e.g. at least about 5 moles of scavenger per mole of formic acid, are ordinarily preferred for the sake of more rapid and complete formic acid removal. It will be recognized that, if the scavenger is an alkanol as distinguished from its acetate ester, excess quantities of the alkanol over and above that required to react with the formic acid will, to some extent, react with acetic acid in the column with a resulting need to recover the resulting alkyl acetate from the column overhead. It will ordinarily be the case therefore, that when using higher ratios of scavenger to formic acid the scavenger will be employed at least in part in the form of its acetate ester.

In connection with the stoichiometry of the reaction, it might be noted that water may sometimes be present in the crude acetic acid as well as being a reaction product in the scavenging reaction itself when the scavenger employed is an alkanol. Water does not have a serious adverse effect on the reaction, particularly when the water content of the liquid passing downwardly through the stripping column is not greater than about 30 mole percent. At water concentrations higher than this, the process can still be employed but there is some tendency toward less complete reaction.

As previously noted, the formate-scavenging reaction does not require a catalyst although esterification catalysts can speed the reaction and are sometimes helpful when operating the column at lower process temperatures.

Column operating conditions

The internal temperature of the reaction section of the column should preferably be maintained at at least about 75° C., preferably 100–150° C. or higher as measured immediately above the point of introduction of the scavenger (i.e. at about the first tray above the scavenger introductoion point when the column is a plate-type column). Temperatures ranging upward through the column to the point at which the crude acetic acid is introduced should also be maintained at at least about 70° C. It will be recognized that, in that embodiment of the invention in which a rectification section is maintained above the crude acid introduction point, temperatures in the upper trays will be lower than in the base.

Column temperature is maintained either by providing vapor boilup with a reboiler or else by introducing scavenger vapor in sufficient quantities to maintain the column at the desired temperature. It will be recognized, when a reboiler is being employed, that the scavenger can be introduced into the column as a liquid if this is more convenient.

The number of trays to be employed in the reaction section of the column (i.e. the section between conduits 5 and 3 in the drawing) is not critical, but about 5 trays (or their equivalent in tower packing) have been found to be satisfactory. More trays can be employed if desired, a larger number of trays being advantageous at low ratios of scavenger to formic acid introduced into the column, but more than about 10 trays are not, as a practical matter, necessary provided that, as discussed below, they provide enough liquid retention volume to give the desired liquid retention time.

In addition to number of trays, liquid retention time on the trays affects the efficiency of the reaction; i.e. higher retention time favors more complete reaction. A retention time on the trays, between the point of introduction of the crude acid and the point of introduction of the scavenger, of about 18 minutes at a temperature of about 80° C. has been found to give satisfactory conversion of formic acid to formate ester. At higher temperatures retention time can be greatly reduced. This retention time is calculated on the basis of crude acid feed rate and on the volume of liquid on the trays.

In those embodiments of the invention in which an additional stripping section is employed below the point of introduction of the scavenger, very effective stripping of volatile components from the purified acetic acid withdrawn from the base of the column obtains when about 10 trays are provided below the point of scavenger introduction. Likewise, when a rectification section is employed in the column above the point of introduction of the crude acetic acid, effective rectification of acetic acid out of the column overhead obtains when there are at least about 10 trays above the point of crude acid introduction. A scavenger recycle stream adequately high in scavenger content and adequately low in alkyl formate content can be obtained from this rectification section by withdrawing it as a sidestream from about the middle of this rectification section. It is not essential that this sidestream be completely free of alkyl formate, only that it contain a predominant amount, e.g. preferably 50% or more, of the scavenger species. Alkyl formate contained in this recycle stream simply rises again through the distillation column without seriously affecting its performance.

It will be recognized that, if desired, a separate distillation column can be employed to rectify the vapors produced in the reaction section of the column (i.e. the vapors rising past conduit 3 in the drawing) instead of having a rectification section in the reaction column 1. Also, a separate column can be employed if desired to strip the purified acetic acid flowing downwardly past conduit 5 in the drawing.

The following examples are given to illustrate the invention further. It will be recognized that, within the scope of the invention, many variations can be made therefrom.

EXAMPLE I

A distillation column was employed which was one inch in diameter with 50 sieve-type trays. At tray 5, counting from the bottom, there was an inlet for introducing a heated liquid stream of formic acid scavenger. At tray 35, also counting from the bottom, there was another inlet for introducing a heated liquid stream of crude acetic acid containing formic acid. Above tray 35 there was a 15-tray rectification section surmounted by an internal reflux condenser containing a swinging-bucket mechanism for dividing the condensate into a distillate takeoff stream and an internal reflux stream.

A reboiler was fitted to the base of the column, in which there was a residue drawoff valve. The column was operated at substantially atmospheric pressure.

Reflux ratio, i.e. the ratio of liquid returned to the top tray to condensate removed from the head of the column, was approximately 30:1.

The crude acetic acid, which comprised 1 weight percent formic acid and the remainder substantially all acetic acid with less than 1% water, was introduced at the rate of 10 ml. per minute at a temperature of 80–85° C. The scavenger, consisting of 25 weight percent methanol and 75 weight percent methyl acetate, was introduced at the rate of 1.0 ml. per minute at a temperature approximately 50° C. Reflux temperature was approximately 54° C., reboiler temperature was approximately 113° C. to 120° C. and distillate takeoff rate was 1.0 ml. per minute.

The volume of liquid retained on the trays of the reaction section of the column, i.e. the 30 trays between tray 5 and tray 35, was approximately 180 ml.

With the column operating in this manner it was found that 77.5% of the formic acid contained in the crude acid fed into the column was removed and withdrawn in the condensate as methyl formate. The condensate contained between 8.0 and 9.5 weight percent methyl formate, approximately 1 weight percent methanol, approximately 0.5 wt. percent water, and 88–90% methyl acetate.

Operation of the same column under comparable conditions but with methyl acetate alone being employed as the scavenger resulted in a somewhat lower efficiency of formic acid removal, the lower efficiency being due to the slower reaction rate of methyl acetate as compared with methanol.

When ethanol was employed as the scavenger, at about the same molar ratio of scavenger to formic acid as employed above, the efficiency of formic acid removal was increased to approximately 80% because of the increased reaction temperature due to the lower volatility of ethanol as compared with methanol.

EXAMPLE II

A 70-tray distillation column, 2 inches in diameter, provided with a reboiler at the base and a swinging-bucket reflux splitter at the head, was employed, operating at atmospheric pressure.

At tray No. 5, counting from the base, there was a connection for introducing the scavenger stream. At tray 50 there was a connection for introducing the crude acetic acid-formic acid stream leaving between these two points a 45-tray reaction section. Above tray 50 there was a 20-tray recitification section, at the midpoint of which (i.e. at tray 60) there was a connection for drawing off a scavenger recycle stream to be reintroduced into the column at tray 5. Distillate was taken off above tray 70.

The column was operated at a reflux ratio of approximately 100:1.

Within the column, the temperature was approximately 105–110° C. at the reboiler, 90–98° C. at tray 25, 87–96° C. at tray 25, 98–100° C. at tray 40, 95–98° C. at tray 50, 52–60° C. at tray 60, and 32–34° C. at the head of the column.

The crude acid fed into the column at tray 50 contained 81.2 wt. percent acetic acid, 10.3 wt. percent formic acid, and 10.4 wt. percent water. The scavenger fed into the column at tray 5 contained 33.8 wt. percent methanol, 7.3 wt. percent methyl formate (derived from the recycle taken at tray 50), and 58.9 wt. percent methyl acetate.

The reaction volume on the trays in the reaction section of the column was approximately 270 ml.

Three runs were made, differing from one another in the rates of injection of crude acid and scavenger:

In the first run crude acid was introduced at the rate of 844.3 grams per hour. Scavenger was introduced at the rate of 282.2 grams per hour. Distillate was recovered from the head of the column at the rate of 62.0 grams per hour and contained 93.0 wt. percent methyl formate, 3.9 wt. percent methyl acetate, and no detectable quantity of methanol. The scavenger recycle drawn off from tray 60 amounted to 279.9 grams per hour and contained 0.2 wt. percent acetic acid, 6.3 wt. percent water, 9.1 wt. percent methyl formate 15.9 wt. percent methanol, and 66.1 wt. percent methyl acetate. As the scavenger recycle was returned to the column at tray 5, sufficient methanol was reincorporated into it to make up for the methanol being withdrawn from the system as methyl formate in the distillate.

A purified acetic acid stream was withdrawn from the base of the column at the rate of 744.4 grams per hour. It contained 4.8 wt. percent formic acid, 87.2 wt. percent acetic acid, and 12.9 wt. percent water. Of the formic acid initially introduced into the column in the crude acid, 59.2% was removed as methyl formate in the distillate.

In a second run in the same column, with substantially the same internal temperatures and crude acid composition, crude acid feed rate was 865 grams per hour. Scavenger, containing 33.8 wt. percent methanol, 7.3 wt. percent methyl formate, and 58.9 wt. percent methyl acetate, was added at tray 5 at 258.4 grams per hour. From tray 60 there was withdrawn 364.0 grams per hour of a stream containing 8.1 wt. percent acetic acid, 16.0% water, 11.9% methyl formate, and 51.1% methyl acetate. Distillate from the head of the column, at 32.0 grams per hour, contained 97.0 wt. percent methyl formate, 1.0% methyl acetate, and 1.4% methanol. Purified acetic acid withdrawn from the base of the column at 678.3 grams per hour contained 88.5 wt. percent acetic acid 4.7% formic acid, and 8.4% water. Of the formic acid contained in the crude acid fed to the column 64.3% had been removed as methyl formate.

In a third run, with substantially the same column temperatures as before and with the same composition of crude acid feed and scavenger, distillate was withdrawn at the rate of 68.7 grams per hour and comprised 95.7 wt. percent methyl formate, 1.3 wt. percent methyl acetate and no detectable quantity of methanol. Crude acid was introduced into the column at a rate of 860.9 grams per hour. The scavenger sidestream was recycled from tray 60 to tray 5 at the rate of 587.8 grams per hour. Composition of this recycle was 3.7 wt. percent acetic acid, 14.1 wt. percent water, 11.0 wt. percent methyl formate, 16.9 wt. percent methanol, and 52.3 wt. percent methyl acetate. Purified acetic acid was withdrawn from the base of the column at the rate of 723.7 grams per hour; the purified acid contained 1.3 wt. percent formic acid, 94.8 wt. percent acetic acid, and 2.7 wt. percent water. Of the formic acid initially introduced into the column in the crude acid, 85.0% had been removed in the form of methyl formate.

The embodiments of the invention in which an exclusive property or privilege is claimed are defined as follows:

1. In a process for reducing the formic acid content of a crude acetic acid stream containing formic acid which comprises preferentially esterifying said formic acid with a formic acid scavenger which is a member of the group consisting of methanol and methyl acetate to form methyl formate, followed by seperating said methyl formate from said acetic acid, the improvement which comprises:
   introducing said crude acetic acid stream continuously into the upper end of a stripping column, operating at a base pressure of at least about one atmosphere absolute, which is heated by a reboiler and which is surmounted by a rectification section;
   continuously passing upwardly through said column a reactive vapor comprising a formic acid scavenger consisting essentially of methanol and methyl acetate;
   reacting countercurrently in said column at least a portion of said scavenger with at least a portion of the formic acid contained in said crude acetic acid at a temperature of at least about 60° C. to form a reaction product comprising methanol, methyl acetate, methyl formate and acetic acid;
   introducing said reaction product in vapor form into the base of said rectification section surmounting said stripping column;
   withdrawing from the head of said rectification section a distillate comprising predominantly methyl formate;
   returning a portion of said distillate into the head of said rectification section as reflux;
   withdrawing a sidestream comprising predominantly a mixture of methanol and methyl acetate from said rectification section at a point intermediate between the base thereof and the level at which said reflux is introduced; and
   recycling said withdrawn mixture to the lower portion of said stripping column.

2. The method of claim 1 further characterized in that a residue stripping section is interposed between the reboiler and the point of introduction of said reactive vapor into said column, the acetic acid being stripped of said formic acid scavenger in said stripping section before being withdrawn from the lower end of said column.

References Cited
UNITED STATES PATENTS

| | | | |
|---|---|---|---|
| 2,433,323 | 12/1947 | Reiter et al. | 260—541 |
| 3,394,058 | 7/1968 | Hohenschutz | 260—541 |

LORRAINE A. WEINBERGER, Primary Examiner

V. GARNER, Assistant Examiner

U.S. Cl. X.R.

260—499, 643 R